United States Patent [19]

Swanson

[11] Patent Number: 4,553,220

[45] Date of Patent: Nov. 12, 1985

[54] MATRIX MULTIPLIER WITH NORMALIZED OUTPUT

[75] Inventor: William E. Swanson, San Diego, Calif.

[73] Assignee: GTI Corporation, San Diego, Calif.

[21] Appl. No.: 496,240

[22] Filed: May 19, 1983

[51] Int. Cl.$^4$ ............................................... G06F 5/00
[52] U.S. Cl. ..................................................... 364/715
[58] Field of Search ............... 364/715, 736, 745, 754, 364/757, 900 MS File, 748

[56] References Cited

U.S. PATENT DOCUMENTS 3,763,365 10/1973 Seitz ..................................... 364/754
4,283,765 8/1981 Rieger ................................. 364/754
4,335,372 6/1982 Aufderheide et al. .............. 364/748

Primary Examiner—David H. Malzahn
Attorney, Agent, or Firm—Morland C. Fischer

[57] ABSTRACT

A matrix multiplier having application to a real time computer-generated imagery or graphics system, wherein the output of the multiplier is normalized to increase both the accuracy and speed by which a three dimensional object can be displayed on a video screen. The output of the matrix multiplier is typically a plurality of multiple (e.g. 32 or more) bit serial data stream. Each data stream is normalized to itself and to each of the other of the plurality of data streams which form the product of the matrix multiplication. That is, a particular segment (e.g. 16 bits) of each data stream is selected for continued processing in order to efficiently and accurately define an object in three dimensional space. The selection of each data stream segment is dependent upon the bit pattern thereof and, more particularly, upon the occurance of a pair of successive bits of opposite polarity relative to one another. Accordingly, in the event that many streams of data contain respective bit patterns wherein a large number of the most significant bits are all of the same polarity, the data streams are normalized or shifted by an identical number of bit positions, wherein some of the most significant bits thereof are discarded while the lesser significant bits are retained. Thus, the data streams are scaled to provide representative data words of both reduced size and maximized precision.

16 Claims, 7 Drawing Figures

MATRIX MULTIPLIER WITH NORMALIZED OUTPUT

BACKGROUND OF THE INVENTION

In certain data processing applications, many large strings of data are frequently transmitted between various signal producing and data processing apparatus. In order to permit all of the bits of the data strings to be transmitted, the corresponding data processing technique has heretofore been characterized by increased throughout delay and relatively complex and expensive processing hardware. However, and in order to avoid the aforementioned characterizations, it has sometimes been common to process only a representative portion or chunk of each different data string. Such a chunk of data is typically selected from a data string in an arbitrary fashion, and the least significant bits thereof are, consequently, often disregarded. Accordingly, while the performance of the processing hardware may be enhanced, the accuracy and precision of the information content is undesirably reduced.

By way of particular example, in a computer-generated imagery or graphics system, a plurality of multiple (e.g. approximately 32 or more) bit data strings are commonly assembled and correlated to describe an object to be displayed in three-dimensional space. By arbitrarily selecting and processing a chunk of data from each data string, the accuracy in displaying an object on a video display is undesirably reduced relative to a description of the object in an original data base, especially if the object is to be displayed while moving away from a paint of origin. Moreover, such arbitrary selection of data chunks increases the likelihood of wraparound (i.e. overflow) when the plurality of data strings are multiplied and summed together. Such wraparound may cause an image to move off one end of a display screen and then appear at the other end thereof.

The present invention relates to an apparatus and efficient method for normalizing a plurality of approximately 35 bit data strings so as to reduce the size and enhance the accuracy of the information content thereof. That is, in a computer graphics system, different pairs of matrices (indicative of the desired location of an object and the movement of such object through space) are multiplied together in order that a three dimensional image can be displayed on a video screen. The resultant fields of each multiplication operation are multiple bit data strings. The data strings are normalized relative to one another so that an accurate representation of the object moving through space can be displayed with increased speed and efficiency and less complex processing and storage hardware than that usually required by computer graphics systems of the prior art. More particularly, the normalized outputs of a matrix multiplier are scaled or shifted a like number of bit positions, so as to provide data words of both reduced size and maximized precision.

Reference may be made to one or more of the following U.S. Patents which generally discloses a floating point normalization and processing system, wherein certain groupings of binary bits are deleted to speed up a multiplication process: Nos.
3,192,363
4,173,789
4,276,607
Additional reference may be made to one or more of the following U.S. Patents which generally discloses a matrix multiplication operation within a computer graphics system: Nos.
3,763,365
4,283,765

However, none of the aforementioned patents discloses or suggests a method and apparatus of optimizing the precision and information content of a plurality of data strings (e.g. the resultant product of a matrix multiplication operation) by selectively normalizing the data strings relative to one another, so as to accurately and efficiently display an object in three dimensional space according to predetermined coordinate requirements.

DESCRIPTION OF THE PREFERRED EMBODIMENT

Figure 1:
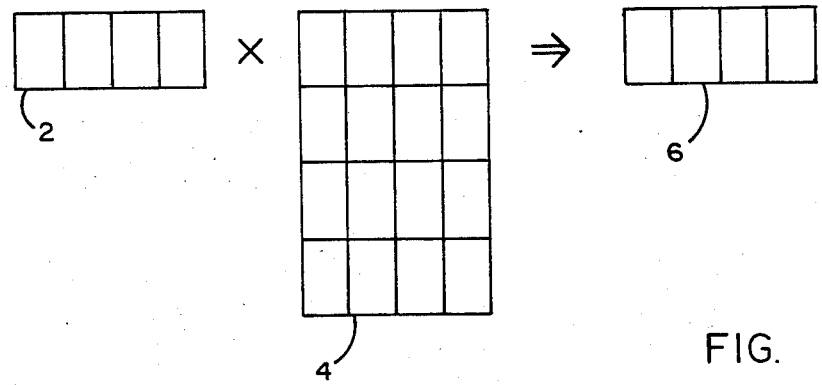
FIG. 1 represents a matrix multiplication operation wherein a $1 \times 4$ matrix is multiplied by a $4 \times 4$ matrix to obtain a $4 \times 4$ resultant matrix.
Figure 2:
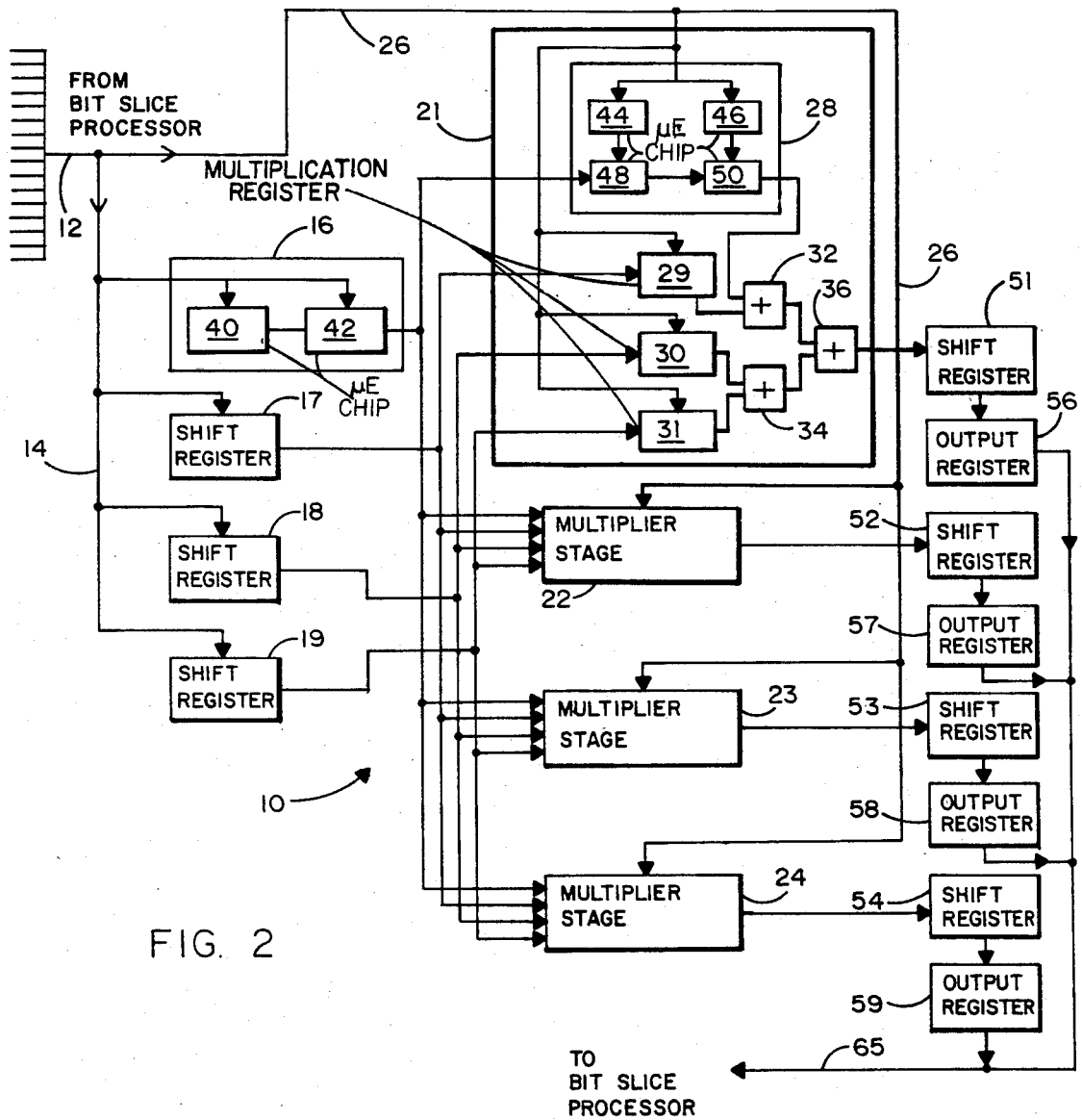
FIG. 2 is a block diagram of a matrix multiplier and normalizer to perform the matrix multiplication of FIG. 1 and to normalize the results thereof.

Referring now to the drawings, FIG. 1 represents the multiplication of two vectors, and FIG. 2 is a block diagram that is representative of an electronic circuit by which to perform the matrix multiplication of FIG. 1. In FIG. 1, a $1 \times 4$ matrix 2 (i.e. a four element vector) is multiplied by a $4 \times 4$ matrix 4, such that the resultant product is another $1 \times 4$ matrix 6. The operation of matrix multiplication such as that shown in FIG. 1 is common to a computer-generated imagery or graphics system in which a position variable object is to be located at one of a variety of different positions in three dimensional space across the screen of a video display. More particularly, $1 \times 4$ matrix 2 is indicative of the coordinates of one point of an object to be displayed. $4 \times 4$ matrix 4 is a transform matrix which includes information regarding the desired orientation of the object to be displayed as the object moves across the screen. That is, matrix 4 contains information relating of the rotation, translation, scaling, and perspective nature of the object, depending upon the direction at which the object is to be viewed.

By way of example, the preferred circuit of FIG. 2 for performing the matrix multiplication of FIG. 1 can be implemented by means of a 25LS14 microelectronic chip manufactured by Advanced Micro Devices, Inc. The aforementioned microelectronic chip can be generally described as an eight bit serial/parallel multiplier chip. In the present embodiment, a pair of such chips are cascaded together to form a two chip set having a sixteen bit parallel input.

In FIG. 1, each of the four elements of matrix 2 is a sixteen bit data string that is representative of a point, defined in well-known homogeneous coordinates, of an object to be displayed. That is, the four elements of matrix 2 are respectively indicative of the homogeneous coordinates (X, Y, Z and W) of such a point. Each of the elements of matrix 4 is representative of a sixteen bit coefficient and is formed by a respective two chip set from the aforementioned 25LS14 microelectronic chip.

Referring particularly to FIG. 2 of the drawings, a matrix multiplier and normalizer 10 is shown to perform the matrix multiplication of FIG. 1. A bit slice processor (not shown) supplies information regarding matrices 2 and 4 to matrix multiplier and normalizer 10 via a sixteen line input data bus 12. By way of example, the bit slice processor may be implemented as a high speed computer comprising four 2901 microelectronic chips cascaded together to control the transfer of information to and from matrix multiplier and normalizer 10. Sixteen bit words are supplied via input data bus 12 and a sixteen line set 14 to each of four shift registers 16, 17, 18 and 19. Thus, each shift register 16-19 is respectively loaded with sixteen bits of data corresponding to one of the homogeneous coordinates X, Y, Z or W of a point to be displayed.

Inasmuch as each of the shift registers 16-19 is of identical construction and operation, only one shift register (e.g. 16) will be described in detail. Shift register 16 preferably comprises a pair of identical 25LS22 microelectronic chips 40 and 42 connected together in series. Each of chips 40 and 42 is supplied with eight of the total of sixteen bits of data that are supplied to shift register 16 via sixteen line set 14. The output of shift register 16 is supplied, one bit at a time, from chip 42 to input terminals of each of four multiplier stages 21, 22, 23 and 24.

Data is supplied from shift registers 16-19 to four multiplier stages 21, 22, 23 and 24. More particularly, an output terminal of each shift register 16-19 is respectively connected to an input terminal of each multiplier stage 21-24. Sixteen bit words, indicative of the coefficients listed in each of the four columns of matrix 4 (of FIG. 1) are supplied via data bus 12 and a sixteen line set 26 from the bit slice processor to each of the four multiplier stages 21-24. Thus, each multiplier stage 21-24 is respectively loaded with four sixteen bit words corresponding to the coefficients which form one of the four columns of matrix 4. Accordingly, and as is common to the operation of matrix multiplication represented in FIG. 1, the coordinate information of matrix 2 (as stored in shift register 16-19) is multiplied by the coefficients comprising the four columns of matrix 4 (as stored in multiplier stages 21-24).

Inasmuch as each of the multiplier stages 21-24 of matrix multiplier and normalizer 10 is of identical construction and operation, only one multiplier stage (e.g. 21) will be described in detail. Multiplier stage 21 comprises four multiplication registers 28, 29, 30 and 31. Sixteen bit words. indicative of each of the four coefficients which form a column of matrix 4 (of FIG. 1) are loaded into respective multiplication registers 28-31 by way of the sixteen line set 26. Each of the multiplication registers 28-31 of multiplier stage 21 is also respectively interconnected with a different one of the four shift registers 16-19. More particularly, sixteen bits of data are supplied, one bit at a time, from shift registers 16-19 to multiplication registers 28-31.

Each multiplier stage multiplication register (e.g. 28) is preferably implemented by 2-two chip sets. The 2-two chip sets comprise an identical 74F374 microelectronic chip 44 and 46 and an identical 25LS14 microelectronic chip 48 and 50. Chips 44 and 46 from each chip set are supplied with eight of the total of sixteen bits of data that are supplied to multiplication register 28 via corresponding sixteen line set 26. Chips 44 and 46 are respectively connected to chips 48 and 50 to supply eight bits of data thereto over a corresponding eight data lines. Chips 48 and 50 are connected in series. Chip 48 receives the serial output from the shift register 16, and chip 50 supplies a serial output from multiplication register 28 to a summer 32.

Output signals are supplied, one bit at a time, from multiplication registers 28 and 29 to summer 32, wherein the products of registers 28 and 29 are summed. Output signals are likewise supplied, one bit at a time, from multiplication registers 30 and 31 to another summer 34, wherein the products of registers 30 and 31 are summed. The outputs of summers 32 and 34 are summed together at an additional summer 36, whereby the matrix multiplication process for one column of matrix 4 (of FIG. 1) can be completed. However, inasmuch as matrix 4 comprises four different columns, the hereinabove matrix multiplication technique performed by matrix multiplier and normalizer 10 is accomplished after one data pass through each of the four multiplier stages 21-24. However, the same set of the homogeneous coordinate information, as stored in shift registers 16-19, is used for each data pass through a multiplier stage 21-24.

A total of four products are provided at the outputs of the four multiplier stages 21-24 as a result of one data pass therethrough when multiplying a 1×4 matrix 2 by a 4×4 matrix 4 in FIG. 1. Each of the output products is representative of one element in the 1×4 product matrix 6 of FIG. 1. More particularly, each data pass through one of the multiplier stages 21-24 produces a respective output typically comprising a 35 bit serial data stream (i.e. the product of multiplying together two sixteen bit numbers). Each of the total of four output streams of data is supplied, the least significant bit first, to respective sixteen bit shift registers 51, 52, 53 and 54 in order that the four products of the matrix multiplication process of FIG. 1 can be normalized, as will be described in greater detail hereinafter while referring to FIGS. 3 and 4. Each of the shift registers 51-54 is interconnected with a respective sixteen bit output register 56, 57, 58 and 59, so that, upon suitable command, the bits stored in shift registers 51-54 can be loaded into respective output registers 56-59. The (normalized) sixteen bit word stored in each of the output registers 56-59 is supplied therefrom to the aforementioned bit slice processor over a common sixteen line output data bus 65.

As previously disclosed, data is passed once through each of the four multiplier stages 24-24 of matrix multiplier and normalizer 10. Accordingly each of multiplier stages 21-24 produces a corresponding one resultant 35 bit data stream so that a respective pair of four different shift registers 51-54 and output registers 56-59 are required to accommodate each resultant data stream. Since each of the shift registers 51-54 and output registers 56-59 at the output of the matrix multiplier and normalizer 10 of FIG. 2 are of identical construction and operation relative to one another, only one pair of shift and output registers 51 and 56 will be described in detail below.

Figure 3:
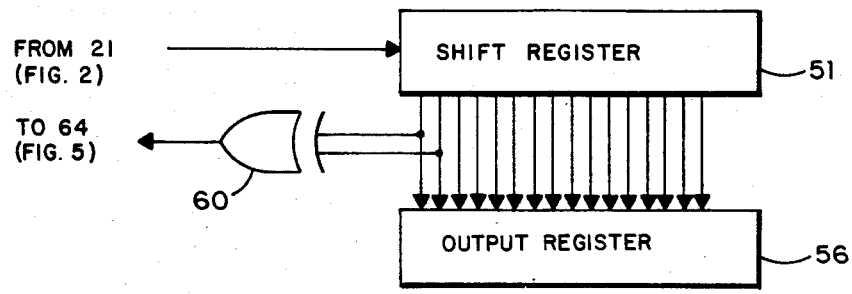
FIG. 3 illustrates apparatus by which to normalize one output data string from the matrix multiplier and normalizer of FIG. 2.

Referring now to FIG. 3 of the drawings, sixteen bit shift register 51 is shown interconnected with sixteen bit output register 56 via sixteen data lines. By way of example, shift register 51 preferably comprises a pair of 25LS22 microelectronic chips cascaded together. Output register 56 preferably comprises a pair of 74F374 microelectronic chips cascaded together.

Figure 4:
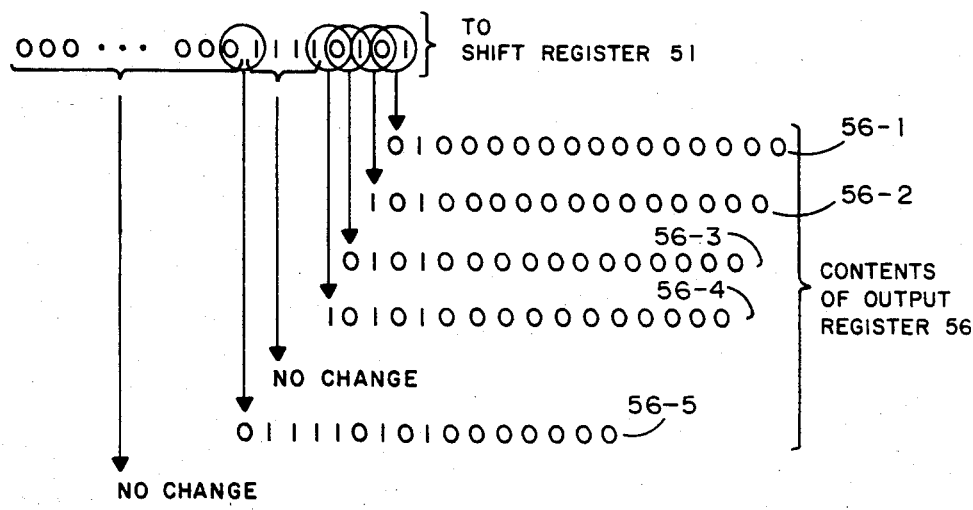
FIG. 4 provides an example of the preferred method for normalizing an output data string by means of the apparatus of FIG. 3.

In accordance with the present invention and referring concurrently to FIGS. 3 and 4 of the drawings, a particular method is now disclosed for normalizing the resultant 35 bit data streams which are indicative of the product of the matrix multiplication performed by the matrix multiplier and normalizer 10 of FIG. 2. As previously indicated, a 35 bit data stream (one of a total of four of which are representative of the product of the matrix multiplication of FIG. 1) is serially supplied from multiplier stage 21 to the input of shift register 51. The first two of the sixteen data lines which interconnect shift register 51 with output register 56 are respectively connected to the input terminals of a 2-input exclusive OR gate 60. Accordingly, exclusive OR gate 60 is responsive to the binary levels of the data bits transmitted over the first two data lines between shift register 51 and output register 56. That is, exclusive OR gate 60 senses a condition of the input data stream at shift register 51 to determine when two successive bits thereof are of opposite polarity relative to one another (i.e. either a 01 or a 10). As will be disclosed in greater detail hereinafter when referring to FIG. 5, whenever such a bit pattern is sensed in shift register 51 (or in any of the other shift registers 52–54), the contents of shift registers 51–54 are concurrently loaded into respective output registers 56–59. Any overflow from the shift registers 51–54 of the least significant bits of the four 35 bit data streams is discarded, as successive bits are serially shifted therethrough.

An example of the presently disclosed normalization method is provided in FIG. 4. For purposes of the present example, it is assumed that the 35 bit data stream being supplied from the matrix multiplier and normalizer 10 of FIG. 2 to shift register 51 consists of the bit pattern 000 . . . 00011110101. Inasmuch as the two least significant bits (01) of the 35 bit data stream sensed by exclusive OR gate 60 are of opposite polarity relative to one another, the contents of shift register 51 are loaded into output register 56 and 56-1. The third bit of the data stream of FIG. 4 is of opposite polarity to the second bit thereof (i.e. 10), and the contents of shift register 51 are again loaded into output register 56 at 56-2. Likewise, the fourth bit of the data stream sensed by exclusive OR gate 60 is of opposite polarity to the third bit (i.e. 01), and the fifth bit is of opposite polarity to the fourth bit thereof (i.e.10), and the contents of shift register 51 are loaded into output register 56 and 56-3 and 56-4 after each of the fourth and fifth bits are successively sensed.

However, the next three bits of the data stream (i.e. 111) successively sensed by exclusive OR gate 60 are of identical polarity relative to one another and to the aforementioned fifth bit thereof. Accordingly, the contents of the output register 56 remain unchanged after each of such next three bits is sensed, inasmuch as exclusive OR gate 60 senses a pair of bits (i.e. 11) of like polarity, such that data will not be transferred from shift register 51 to output register 56. In the event that a succeeding bit (i.e. the ninth least significant bit) of the 35 bit data stream is of opposite polarity relative to a proceeding (i.e. eighth) bit thereof (i.e. 01), the contents of shift register 51 are once again loaded into output register 56 at 56-5. In the present example of FIG. 4 and for the purpose of simplicity, it is assummed that each bit remaining in the 35 bit data stream (i.e. 00 . . . 00) is of identical polarity relative to one another (and to the aforementioned ninth bit). Hence, and as previously indicated, the contents of the output register 56 remain unchanged after each of such remaining bits is serially propagated through shift register 51 and sensed by the exclusive OR gate 60, and no additional data is transferred from shift register 51 to output register 56.

The sixteen bit binary number stored in output register 56 after the 35 bit data stream is serially propagated through shift register 51 is the normalized output of the multiplier stage 21 of the matrix multiplier and normalizer 10 of FIG. 2. That is, the last sixteen bit number loaded into output register 56 from shift register 51 is one of four normalized products from the multiplier stages 21–24 of the matrix multiplier and normalizer 10. In the present example of FIG. 4, the sixteen bit normalized output stored in output register 56 (at 56-5) consists of the bit pattern 0111101010000000. Accordingly, the normalized binary number stored in output register 56 provides an accurate and compact sixteen bit representation of the resultant 35 bit data stream supplied to shift register 51 from the output of matrix multiplier and normalizer 10.

Figure 5:
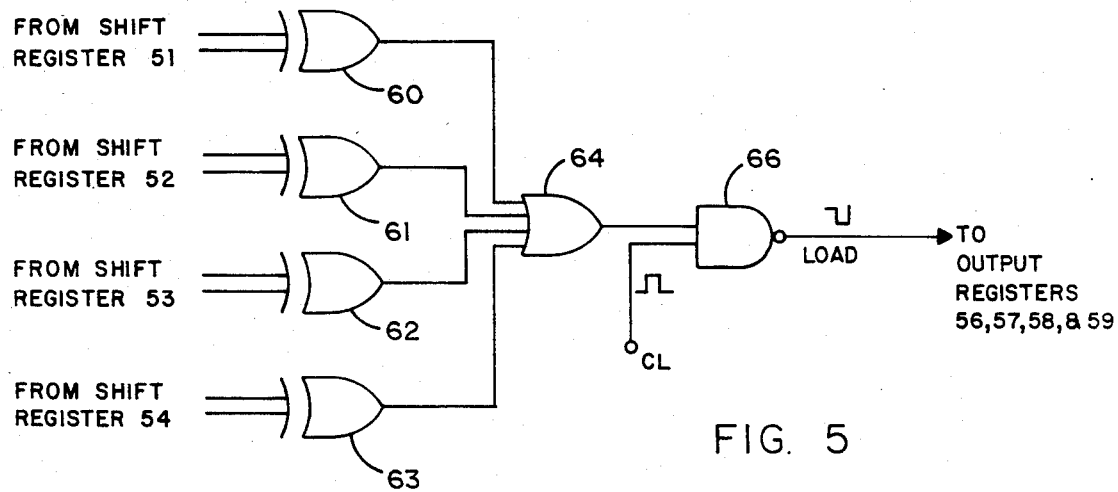
FIG. 5 illustrates logic for controlling the operation of the apparatus of FIG. 3 for normalizing a plurality of output data strings.

However, and as was previously described, one data pass is required for each of the four multiplier stages 21–24 of the matrix multiplier and normalizer 10 in order to perform the matrix multiplication of FIG. 1. Therefore, and as was also previously disclosed, four corresponding pairs of shift registers 51–54 and output registers 56–59 are utilized to accommodate respective 35 bit serial data streams from each of the multiplier stages. Referring now to FIG. 5 of the drawings, logic is shown by which to synchronously control the operation of the four pairs of shift registers 51–54 and output registers 56–59 of FIG. 2, whereby to cause the four resultant streams of data (representative of one data pass through each of the four multiplier stages 21–24) to be normalized relative to one another. More particularly, each pair comprising a shift register and output register 51, 56 and 52, 57 and 53, 58 and 54, 59 of FIG. 2 has a respective 2-input exclusive OR gate 60, 61, 62 and 63 associated therewith in an identical fashion to the connection of exclusive OR gate 60 to registers 51 and 56, as earlier described when referring to FIG. 3. The input terminals of each exclusive OR gate 60–63 of FIG. 5 are respectively connected to the first two of the sixteen data lines which connect a shift register 51–54 to an associated output register 56–59 in FIG. 2.

The output terminals of each of the four exclusive OR gates 60–63 are connected to a conventional 4-input OR gate 64. The output terminal of an exclusive OR gate 60–63 is driven to a relative HI logic level whenever, as previously disclosed, a condition is sensed from a respectively connected shift register 51–54 that two successive bits of a serial data stream supplied thereto are of opposite polarity relative to one another. As will be known to those skilled in the art, the output terminal of OR gate 64 is driven to a relatively HI logic level whenever the output terminal of at least one exclusive OR gate 60–63 is also driven to a relatively HI logic level. The output terminal of OR gate 64 is connected to one input terminal of a conventional 2-input NAND gate 66. The second input terminal of NAND gate 66 is connected to a recurring source of clock pulses, designated CL. The output terminal of NAND gate 66 is driven to a relatively LO logic level whenever a clock pulse CL is provided at one of the input terminals thereof at the same time that the other of the input terminals is driven to a relatively HI logic level (via the output terminal of OR gate 64), so as to be indicative of a data stream bit pattern suitable to cause normalization. NAND gate 66 is connected to each of the output registers 56–59 to supply a LOAD control signal thereto for causing the contents of each shift register 51–54 to be loaded into its associated output register 56–59 during the transistion of such control signal from a LO to a HI logic level.

Accordingly, when any of the 35 bit data streams provided by any of the multiplier stages 21–24 of matrix multiplier and normalizer 10 contain a bit pattern including two successive bits of opposite polarity, at least one of the exclusive OR gates 60–63 will be driven to an output state which is sufficient to cause the generation of the LOAD control signal and the subsequent loading into output registers 56–59 of respective sixteen bit representations of the 35 bit data streams. Inasmuch as the LOAD control signal is provided whenever the exclusive OR gates 60–63 sense the aforementioned condition in any one or more of the total of four data streams, such condition to cause the loading of data between one pair of shift and output registers is sufficient to concurrently cause the loading of data between all of the other pairs of shift and output registers. Thus, after each of the 35 bit data streams are propagated through respective shift registers 51–54, output registers 56–59 will respectively contain sixteen bit binary numbers which are normalized relative to one another (i.e. which are the resultant of the same number of data transfers form shift registers 51–54 to associated output registers 56–59).

Thus, four resultant products from the matrix multiplier and normalizer 10 of FIG. 2 are normalized and stored in output registers 56–59. By virtue of the foregoing normalization process, each of the four 35 bit data streams provided by respective multiplier stages 21–24 is shifted or scaled by an identical amount, so as to provide representative sixteen bit data words of reduced size and maximized precision. The four sixteen bit words (representative of the elements of 1×4 product matrix 6 of FIG. 1) are supplied from output registers 56–59 to the bit slice processor by way of the sixteen line output data bus 65, and matrix multiplier and normalizer 10 is in a condition to perform an additional matrix multiplication operation, as described above.

Figure 6:
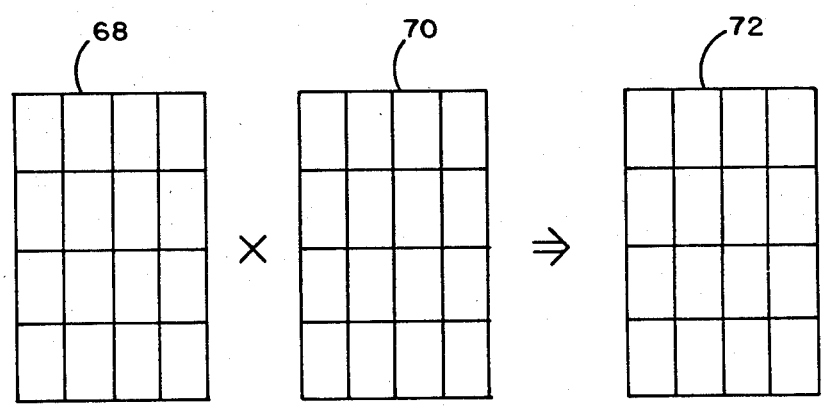
FIG. 6 represents another matrix multiplication operation wherein a $4 \times 4$ matrix is multiplied by $4 \times 4$ matrix to obtain a $4 \times 4$ resultant matrix.

As will be appreciated by those skilled in the art, it is often desirable to concurrently control the translational and rotational movement of an object to be displayed by a computer graphics system. By way of example, such control is required to change the position of an object moving across a video display while turning the object from side-to-side. To accomplish the foregoing, and as is represented in FIG. 6 of the drawings, a 4×4 matrix 68 is multiplied by another 4×4 matrix 70 to achieve a resultant 4×4 product matrix 72. The process of multiplying two 4×4 matrices 68 and 70 to simultaneously control the translation and rotation of an object to be displayed is known in the art as matrix concatenation. That is, resultant product matrix 72 produces a new transformation which is a composite of the original transformations (e.g. controlling rotation, scaling, perspective transforms, or combinations thereof) as represented by the elements of matrices 68 and 70.

Figure 7:
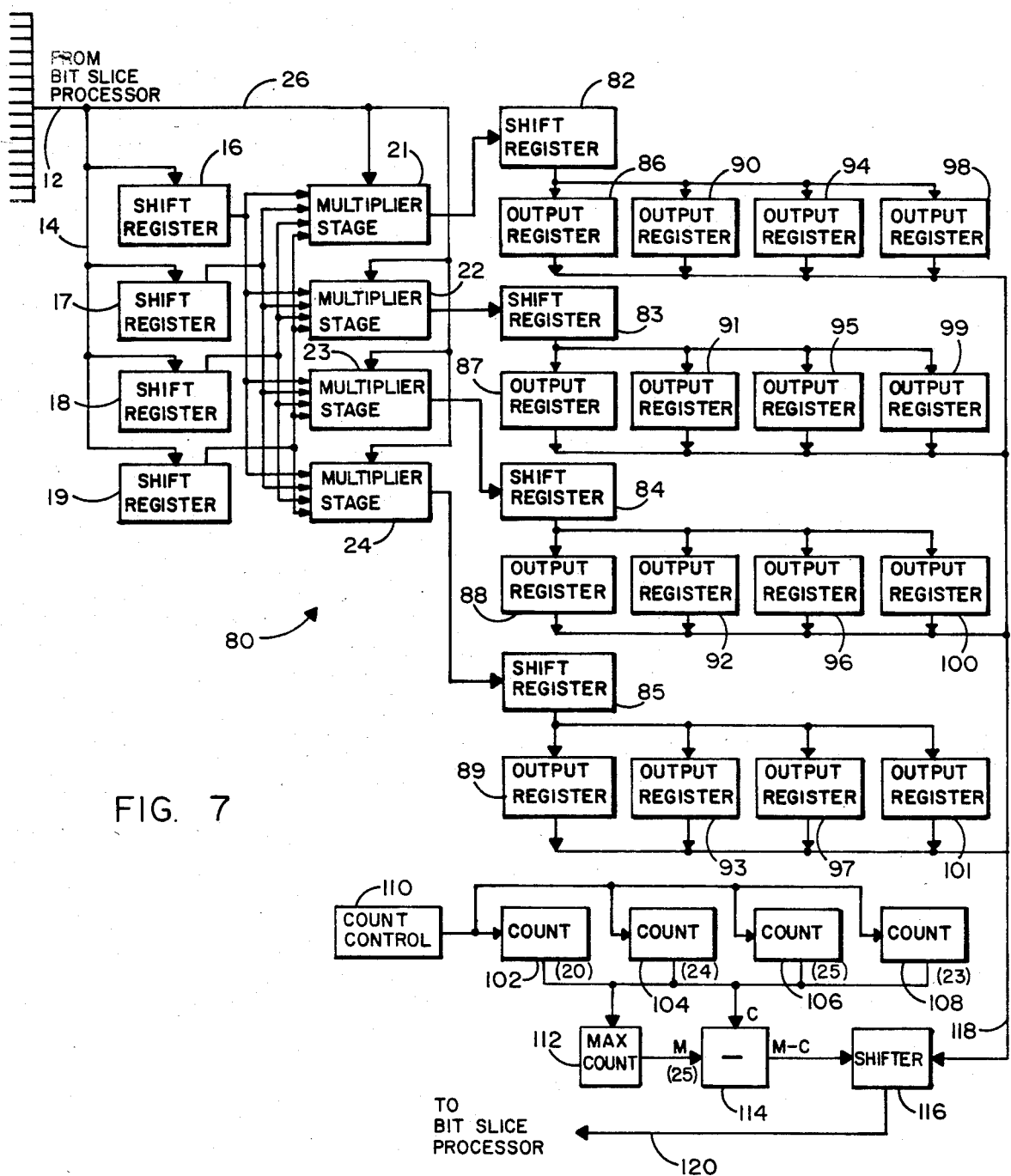
FIG. 7 is a block diagram of a matrix multiplier and normalizer to perform the matrix multiplication of FIG. 6 and to normalize the results thereof.

To efficiently perform the matrix multiplication of FIG. 6, a matrix multiplier and normalizer 80, similar to that shown in FIG. 2, is employed. Referring to FIG. 7 of the drawings, four shift registers 16–19 are interconnected with four multiplier stages 21–24 and a bit slice processor by way of sixteen line input data bus 12 and sixteen line seats 14 and 26. Inasmuch as shift registers 16–19 and multiplier stages 21–24 are identical to those which have already been described when referring to FIG. 2, such components will not again be described, although the same reference numerals will be used therefor in each of FIGS. 2 and 7. However, unlike the multiplier and normalizer of FIG. 2, data, which is indicative of the elements of matrix 70 of FIG. 6, is passed four times through each one of the four multiplier stages 21–24, to obtain the resultant 4×4 matrix 72 of FIG. 6. Moreover, unlike 1×4 matrix 2 of FIG. 1, 4×4 matrix 68 of FIG. 6 includes an array of four rows and four columns of information. Accordingly, and to conserve logic, data (corresponding to the elements which form each of a different row of matrix 68) is supplied from the bit slice processor to respective shift registers 21–24 during each of the four successive data passes through multiplier stages 21–24.

Each of the multiplier stages 21–24 produces a resultant 35 bit data stream after each data pass therethrough. Inasmuch as four data passes are made through each of the four multiplier stages 21–24, a total of sixteen 35 bit data streams are produced, which are representative of the elements of resultant 4×4 matrix 72. However, to reduce the size of the 35 bit streams of data (to sixteen bits) while accurately representing the product of the matrices to be multiplied by the matrix multiplier and normalizer 80, the data streams produced during each of the four passes through multiplier stages 21–24 are normalized.

More particularly, and in accordance with another aspect of the present invention, matrix multiplier and normalizer 80 includes normalizer logic to accomplish the foregoing. Each of the four multiplier stages 21–24 is respectively connected to a shift register 82, 83, 84 and 85, so as to serially supply thereto the resultant 35 bit data streams after each pass through stages 21–24. Each of the four shift register 82–85 is respectively connected, via sixteen data lines, to four output registers. Thus, a total of sixteen output registers 86–101 are employed to normalize the output streams of data from multiplier stages 21–24. As illustrated in FIG. 7, shift register 82 is connected to the output registers 86, 90, 94 and 98. Shift register 83 is connected to the output registers 87, 91, 95 and 99. Shift register 84 is connected to the output registers 88, 92, 96 and 100. Shift register 85 is connected to the output registers 89, 93, 97 and 101. By way of example, the interaction of shift registers 82–85 with respective columns of output registers 86–101 is controlled by means of a selector switch, such as a 74F139 microelectronic demultiplexer chip.

In operation, 35 bit data streams provided by multiplier stages 21–24 during the first of the four data passes therethrough are supplied, bit by bit, to shift registers 82–85. Similar to that disclosed while referring to FIGS. 3–5, a LOAD control signal is generated, whereby sixteen bits of data are concurrently loaded from shift registers 82–85 to a selected first column of associated output registers 86–89 whenever a bit pattern in any of the data streams is sensed (by logic similar to that shown in FIG. 5), such that two successive bits are of opposite polarity relative to one another. After the 35 bit data streams are propagated through shift registers 82–85, the sixteen bit binary number remaining in each of the associated output registers 86–89 represents the normalized product of the first data pass through multiplier stages 21–24. A first shift counter 102, associated with the first column of output registers 86–89, counts the number of bits that has been shifted through shift registers 82–85 every time that data is concurrently loaded from shift registers 82–85 into associated output registers 86–89 during the first data pass through multiplier stages 21–24.

During the second of the four data passes through multiplier stages 21–24, additional 35 bit data streams are again supplied, bit by bit, to shift registers 82–85. Another LOAD control signal is generated, and sixteen bits of data are concurrently loaded from shift registers 82–85 to a selected second column of associated output registers 90–93 whenever a bit pattern in any of the data streams is sensed, such that two successive bits thereof are of opposite polarity relative to one another. After the 35 bit data streams are propagated through shift registers 82–85, the sixteen bit binary number remaining in each of the associated output registers 90–93 represents the normalized product of the second data pass through multiplier stages 21–24. A second shift counter 104, associated with the second column of output registers 90–93, counts the number of bits that has been shifted through shift registers 82–85 every time that data is concurrently loaded from shift registers 82–85 into associated output registers 90–93 during the second data pass through multiplier stages 21–24.

During the third of the four data passes through multiplier stages 21–24, 35 bit data streams are again supplied, bit by bit, to shift registers 82–85. Sixteen bits of data are concurrently loaded from shift registers 82–85 to a third column of associated output registers 94–97 whenever a bit pattern in any of the data streams is sensed, such that two successive bits thereof are of opposite polarity relative to one another. After the 35 bit data streams are propagated through shift registers 82–85, the sixteen bit binary number remaining in each of the associated output registers 94–97 represents the normalized product of the third data pass through multiplier stages 21–24. A third shift counter 106, associated with the third column of output registers 94–97, counts the number of bits that has been shifted through shift registers 82–85 every time that data is concurrently loaded from shift registers 82–85 into associated output registers 94–97 during the third data pass through multiplier stages 21–24.

During the fourth of the four data passes through multiplier stages 21–24, 35 bit data streams are supplied, bit by bit, to shift registers 82–85. Sixteen bits of data are concurrently loaded from shift registers 82–85 to a fourth column of associated output registers 98–101 whenever a bit pattern in any of the data streams is sensed, such that two successive bits thereof are of opposite polarity relative to one another. After the 35 bit data streams are propagated through shift registers 82–85, the sixteen bit binary number remaining in each of the associated output registers 98–101 represents the normalized product of the fourth data pass through multiplier stages 21–24. A fourth shift counter 108, associated with the fourth column of output registers 98–101, counts the number of bits that has been shifted through shift registers 82–85 every time that data is concurrently loaded from shift registers 82–85 into associated output registers 98–101 during the fourth data pass through multiplier stages 21–24.

After four data passes are completed through multiplier stages 21–24, whereby the elements which form a different row of matrix 68 (of FIG. 6) are multiplied by the elements which form a different column of matrix 70 during each data pass, shift counters 102, 104, 106 and 108 have respectively stored therein an indication of the number of bits that have been shifted through shift registers 82–85 at the last of the times that the contents of shift registers 82–85 are loaded into the output registers 86–101 which form each of the four columns thereof. Each shift counter 102, 104, 106 and 108 is preferably a register which is adapted to count to at least 35 (inasmuch as 35 bits of data are shifted through each of the shift registers 82–85). A counter controller 110 is interconnected with each of the shift counters to control the operations thereof during each of the four passes of data through multiplier stages 21–24. Moreover, each column of output registers 86–101 is interfaced with controller 110 by way of a common load line (not shown).

The count stored in any shift counter 102, 104, 106 or 108 is augmented each time that the aforementioned bit pattern is detected and data is loaded from shift registers 82–85 into a respective column of output registers 86–101. However, as will be appreciated by those skilled in the art, because of the different bit patterns which form the output streams of data from multiplier stages 21–24 during succeeding data passes therethrough, the numbers stored in shift counters 102, 104, 106 and 108 will usually be different from one another. Thus, the four sixteen bit binary numbers stored in each column of output registers (86–99, 90–93, 94–97 and 98–101) will be normalized to themselves, but not to each other. That is, because of the different shift counts, each column of four binary numbers is normalized column by column, but all four of the columns are not necessarily normalized to one another.

Accordingly, another counter 112 is interfaced with each of the shift counters 102, 104, 106 and 108. Counter 112 is preferably a register which is adapted to record the maximum count stored in any of the shift counters. Hence, the maximum count of counter 112 will be identical to the count stored in at least one of the shift counters 102, 104, 106 or 108 and will be indicative of the maximum number of bits that has been shifted through shift registers 82–85 at any of the times that data from shift registers 82–85 is loaded into a respective one of the four columns of output registers 86–101. A signal representing the number (designated M) stored in counter 112 is supplied to one input terminal of a subtracter 114. Signals representing the numbers (designated C) stored in each of the shift counters 102, 104, 106 and 108 are supplied, one number at a time, to a second input terminal of subtracter 114. Thus, subtracter 114 provides at an output terminal thereof a representation of the difference (designated $M-C$) between the maximum count of counter 112 and the respective counts of the shift counters 102, 104, 106 and 108. The aforementioned difference provided by subtracter 114 is supplied to one input terminal of a shifter 116. By way of example, shifter 116 is preferably a conventional barrel shifter, such as that implemented from a network of eight 25S10 microelectronic chips. Each of the output registers 86–101 which forms the four columns thereof is interconnected with a second input terminal of shifter 116 by way of a common sixteen line set 118.

The method by which the sixteen bit binary numbers stored in each column of output registers 86-101 are normalized relative to one another is now described while continuing to refer to FIG. 7. Although data stored in the output registers 86-101 may be supplied either row by row or column by column thereof to sixteen line set 118, in the present example, data stored in the 4×4 array of output registers is supplied to shifter 116 column by column. For the purpose of this example only, it will be assumed that the numbers stored in shift counters 102, 104, 106 and 108 are 20, 24, 25, and 23, respectively. Therefore, the number 25 is also stored in counter 102, inasmuch as 25 is the maximum number of bits that has been shifted through shift registers 82-85 at any of the times that data is loaded from the shift registers 82-85 into any of the four columns of output registers (i.e. 94-97).

Initially, data from the first column of output registers 86-89 is supplied to sixteen line set 118. A signal representing the number (e.g. C=20) stored in shift register 102 (corresponding to the number of bits that has been shifted through shift registers 82-85 at the last of the times that data is loaded from the shift registers 82-85 into the first column of output registers 86-89) is supplied to one input terminal of subtracter 114. A signal representing the number (e.g. M=25) stored in counter 112 (corresponding to the maximum number of bits that has been shifted through shift registers 82-85 at any of the times that data is loaded from the shift registers 82-85 into any column of output registers 94-97) is supplied to the other input terminal of subtracter 114. The output of subtracter 114 is a signal representing the difference (e.g. M−C=5) between the maximum count of counter 112 and the count of shift counter 02. Accordingly, the output signal of subtracter 114 is supplied to shifter 116, so as to cause each of the four sixteen bit numbers supplied thereto via sixteen lines set 118 from the first column of output registers 86-89 to be shifted by a corresponding five bit positions. Therefore, and by way of further example, if the sixteen bit number 1110100101101110 were to be supplied to shifter 116 from one of the output registers 86-89, the output of shifter 116 would be the normalized representation thereof, i.e. XXXXX11101001011. That is, the original sixteen bit data stream supplied to shifter 116 is shifted an additional five bit positions, and the five least significant bits thereof are discarded. The five most significant bits (designated XXXXXX) of the normalized representation are forced by shifter 116 to either of a binary 1, if the number is negative, or a binary 0, if the number is positive.

Data from the second column of output registers 90-93 is then supplied to sixteen line set 118. A signal representing the number (e.g. C=24) stored in shift counter 104 (corresponding to the number of bits that has been shifted through shift registers 82-85 at the last of the times that data is loaded from shift registers 82-85 into the second column of output registers 90-93) is supplied to one input terminal of subtracter 114. A signal representing the number (e.g. M=25) stored in counter 112 (corresponding to the maximum number of bits that has been shifted through shift registers 82-85 at any of the times that data is loaded from the shift registers 82-85 into any column of output registers 94-97) is supplied to the other input terminal of subtracter 114. The output of subtracter 114 is a signal representing the difference (e.g. M−C=1) between the maximum count of counter 112 and the count of shift counter 104. Accordingly, the output signal of subtracter 114 is supplied to shifter 116, so as to cause each of the four sixteen bit numbers supplied thereto via sixteen line set 118 from the second column of output registers 90-93 to be shifted by a corresponding one bit position. Therefore, and by way of further example, if the sixteen bit number 0010111010011100 were to be supplied to shifter 116 from one of the output registers 90-93, the output of shifter 116 would be the normalized representation thereof, i.e. X001011101001110. That is, the original sixteen bit data stream supplied to shifter 116 is shifted an additional one bit position, and the least significant bit thereof is discarded. The most significant bit (designated X) of the normalized representation is forced by shifter 116 to either of a binary 1, if the number is negative, or a binary 0, if the number is positive.

Data from the third column of output registers 94-97 is then supplied to sixteen line set 118. A signal representing the number (e.g. C=25) stored in shift counter 106 (corresponding to the number of bits that has been shifted through shift registers 82-85 at the last of the times that data is loaded from the shift registers 82-85 into the third column of output registers 94-97) is supplied to one input terminal of subtracter 114. A signal representing the number (e.g. M=25) stored in counter 112 (corresponding to the maximum number of bits that has been shifted through shift registers 82-85 at any of the times that data is loaded from the shift registers 82-85 into any column of output registers) is supplied to the other input terminal of subtracter 114. The output of subtracter 114 is a signal representing the difference (e.g. M−C=0) between the maximum count of counter 112 and the count of shift register 106. Accordingly, the output signal of subtracter 114 is supplied to shifter 116, so as to cause each of the four sixteen bit numbers supplied thereto via sixteen line set 118 from the third column of output registers 94-97 to propagate through shifter 116 in an unchanged condition. That is, the sixteen bit numbers stored in output registers 94-97 are already in a normalized condition, and no additional shifting thereof is required.

Lastly, data from the fourth column of output registers 98-101 is supplied to sixteen line set 118. A signal representing the number (e.g. C=23) stored in shift counter 108 (corresponding to the number of bits that has been shifted through shift registers 82-85 at the last of the times that data is loaded from the shift registers 82-85 into the fourth column of output registers 98-101) is supplied to one input terminal of subtracter 114. A signal representing the number (e.g. M=25) stored in counter 112 (corresponding to the maximum number of bits that has been shifted through shift registers 82-85 at any of the times that data is loaded from the shift registers 82-85 into any of the columns of output registers 94-97) is supplied to the other input terminal of subtracter 114. The output of subtracter 114 is a signal representing the difference (e.g. M−C=2) between the maximum count of counter 112 and the count of shift counter 108. Accordingly, the output signal of subtracter 114 is supplied to shifter 116, so as to cause each of the four sixteen bit numbers supplied thereto via sixteen line set 118 from the fourth column of output registers 98-101 to be shifted by a corresponding two bit positions. Therefore, and by way of further example, if the sixteen bit number 0101110001001100 were to be supplied to shifter 116 from one of the output registers 98-101, the output of shifter 116 would be the normalized representation thereof, i.e. XX01011100010011. That is, the original sixteen bit data stream supplied to shifter 116 is shifted an additional two bit positions, and the two least significant bits thereof are discarded. The two most significant bits (designated XX) of the normalized representation are forced by shifter 116 to either of a binary 1, if the number is negative, or a binary 0, if the number is positive.

Each of the total of 16-sixteen bit normalized numbers are supplied, one number at a time, from shifter 116 to the bit slice processor by way of sixteen line output data bus 120, so that additional matrix multiplication and normalization procedures of FIG. 6 can be performed by the matrix multiplier and normalizer 80 of FIG. 7. As will be appreciated by those skilled in the art, matrix multiplier and normalizer 80 produces at least one column of four sixteen bit numbers (e.g. stored in output registers 94-97 in the aforementioned example) that are initially in a final normalized condition. Each of the remaining columns of sixteen bit numbers stored in the other output registers are shifted (i.e. scaled) a particular amount in shifter 116, so that every sixteen bit number in the 4×4 array thereof (corresponding to the elements of product matrix 72 of FIG. 6) is shifted the same number of bit positions, whereby the output of shifter 116 is 16-sixteen bit numbers that are normalized relative to one another. Moreover, no net effect is produced by forcing certain ones of the most significant bits of the normalized numbers to a binary 1 in a negative number or a binary 0 in a positive number, as disclosed above.

Although separate matrix multiplier and normalizer configurations 10 and 80 are used to perform the matrix multiplication and normalization depicted in FIGS. 1 and 6, respectively, it is to be understood that the multiplier and normalizer 80 can, otherwise, be used in both cases. However, when a 1×4 matrix is to be multiplied by a 4×4 matrix (such as in the case of FIG. 1), the counters 102, 104, 106, 108 and 110 would be deactivated (inasmuch as only a single column of output registers is required), and sixteen bit data words would be propagated through shifter 116 from sixteen line set 118 to the bit slice processor without the occurrence of any additional shifting.

By virtue of the present invention, multiple (e.g. 35) bit serial data streams (indicative of the product of an operation of matrix multiplication), wherein at least some of the most significant bits thereof are of the same polarity, may be normalized and thereby reduced in size to representative segments of sixteen bits in length while preserving the accuracy in the information content of the data streams. Hence, the herein disclosed normalization method permits the dynamic range of the product of the matrix multiplication to be expanded by approximately sixteen bits or more. Therefore, the elements of a 4×4 product matrix can be represented by sixteen bit data words of maximum precision, such that relatively long streams of data can be shifted (i.e. scaled) relative to one another to provide normalized numbers of reduced size and maximized information content. Unlike the prior art processing and display techniques in which a data chunk is arbitrarily selected from a data stream to reduce the length thereof, the presently disclosed normalization method selectively identifies a segment of the data stream which is an accurate representation of the information content thereof. Accordingly, in a real time computer graphics system, or the like, wherein very large numbers of data streams are rapidly processed for displaying a three dimensional object moving through space, the throughput delay, complexity, and corresponding cost of such a system can be advantageously minimized.

It will be apparent that while a preferred embodiment of the invention has been shown and described, various modifications and changes may be made without departing from the true spirit and scope of the invention. For example, although the present matrix multiplier and normalizer is described as having particular application to a computer graphics system, this is not to be regarded as a limitation of the claimed invention. That is, the present invention is also applicable to any data processing system in which many large streams of data bits are to be efficiently processed in a representative format of reduced size of maximum precision.

Having thus set forth the preferred embodiment, what is claimed is:

1. Apparatus for normalizing a plurality of multiple bit data streams for minimizing the size of the data streams while substantially preserving the information content thereof, said apparatus comprising:
    a plurality of first register means, each of said first register means receiving therein a respective multiple bit data stream one bit at a time,
    detection means interconnected with each of said plurality of first register means and responsive to the signal levels of successive bits which form each of the respective data streams, and
    a plurality of second register means, each of which being interconnected with a respective one of said plurality of first register means,
    said detection means generating an output signal for causing the contents of said plurality of first register means to be concurrently loaded into respective ones of said plurality of second register means whenever said detection means detects particular signal levels for any successive bits which form any of said respective data streams in said plurality of first register means, the last data bits loaded into said plurality of second register means providing a normalized representation of each of said corresponding plurality of data streams.

2. The apparatus recited in claim 1, wherein said plurality of first register means are shift registers, and said plurality of multiple bit data streams are serially propagated through respective ones of said shift registers.

3. The apparatus recited in claim 2, wherein each of said shift registers has a bit capacity that is less than the number of data bits in any of said plurality of multiple bit data streams, so that any overflow of the data streams being propagated through respective shift registers is discarded.

4. The apparatus recited in claim 3, wherein said plurality of second register means has the same bit capacity as that of said plurality of first register means shift registers, so that the the number of data bits loaded into said plurality of second register means from respective shift registers is less than the corresponding number of bits which forms any of said plurality of multiple bit data streams being supplied to said shift registers.

5. The apparatus recited in claim 4, wherein said first and second register means are respectively interconnected with one another by a number of data lines, which number of lines corresponds to the bit capacity of each of said register means, and said detection means being interconnected with certain ones of said data lines, so as to be responsive to the signal levels of successive data bits which form respective data streams.

6. The apparatus recited in claim 5, wherein said multiple bit data streams are supplied bit by bit to respective first register means shift registers, said detection means interconnected with the first two of said data lines for detecting the signal levels of successive two bit data sets as said multiple bit data streams are serially propagated through respective shift registers.

7. The apparatus recited in claim 6, wherein said detection means is adapted to detect a bit pattern wherein the bits of any successive two bit set of a respective data stream are of opposite polarity relative to one another, the contents of said plurality of first register means shift registers being concurrently loaded into respective ones of said plurality of second register means every time that said detection means detects said bit pattern in any of said plurality of data streams.

8. The apparatus recited in claim 7, wherein said detection means includes a plurality of 2-input exclusive OR gates, first and second input terminals of said gates respectively connected to first and second data lines between respective pairs of said first and second register means for detecting the bit patterns of successive two bit data sets which form the multiple bit data streams being supplied to said first register means.

9. The apparatus recited in claim 8, wherein said detection means further includes signal gating means interconnected with each of said plurality of exclusive OR gates, said signal gating means adapted to generate a LOAD control signal for causing the contents of said plurality of first register means to be concurrently loaded into respective ones of said second register means whenever any of said exclusive OR gates detects said particular bit pattern in any successive two bit data set which forms a corresponding multiple bit data stream.

10. Apparatus for normalizing a plurality of multiple bit data streams relative to one another for minimizing the size of each data stream while substantially preserving the information content thereof, said apparatus comprising:

a plurality of shift register means to receive therein respective ones of said data streams one bit at a time, detection means interconnected with each of said plurality of shift register means and responsive to the signal levels of the bits which form each of the multiple bit data streams, a plurality of output register means interconnected with respective ones of said plurality of shift register means, said detection means adapted to detect a particular bit pattern wherein any two successive bits of a data stream are of opposite polarity relative to one another as said data streams are serially shifted through respective shift register means, and said detection means also being interconnected with each of said plurality of output register means for causing the contents of said plurality of shift register means to be concurrently loaded into respective ones of said plurality of output register means whenever said detection means detects said particular bit pattern in any of said plurality of data streams, the last data bits to be loaded into each of said plurality of output register means providing a normalized representation of each of said corresponding data streams.

11. The apparatus recited in claim 10, wherein said plurality of output register means are arranged in an array of at least two rows and two columns thereof, each of said plurality of shift register means interconnected with a respective row of said array of output register means, and each of said shift register means receiving some of said plurality of multiple bit data streams one data stream at a time, the contents of said shift register means being concurrently loaded into respective columns of said output register means during the receipt by said shift register means of corresponding ones of said multiple bit data streams whenever said particular bit pattern is detected in any of said data streams in at least one of said shift register means.

12. The apparatus recited in claim 11, further comprising a plurality of shift counter means interfaced with respective columns of said output register means for providing a count of the number of bits of said multiple bit data streams that have been shifted through said plurality of shift register means at the last of the times that the contents of said shift register means are concurrently loaded into said respective columns of output register means, and maximum counter means interfaced with each of said shift counter means to record the largest number counted by any of said shift counter means.

13. The apparatus recited in claim 12, further comprising subtractor means, said subtractor means interconnected with each of said shift counter means and said maximum counter means, said subtractor means providing signals which are indicative of the respective differences between the number recorded by said maximum counter means and the numbers counted by said plurality of shift counter means.

14. The apparatus recited in claim 13, further comprising shifter means interconnected with said subtractor means and each of said output register means, said shifter means receiving the contents of the plurality of output register means which form respective columns thereof and shifting each of said contents by a number of bit positions corresponding to the particular signal provided by said subtractor means for each of said respective columns of output register means, the shifted contents providing representations of the normalized multiple bit data streams which are loaded into the columns of said plurality of output register means with each of the columns of data streams also being normalized to one another.

15. The apparatus recited in claim 10, wherein said detection means comprises a plurality of 2-input exclusive OR gates, the input terminals of each of said exclusive OR gates interfaced with a respective one of said shift register means for detecting the bit patterns of successive two bit data sets from a multiple bit data stream being supplied to said respective shift register means.

16. A method for normalizing a plurality of multiple bit data streams relative to one another for minimizing the size of each data stream while substantially preserving the information content thereof, said method comprising the steps of:
supplying said data streams, one bit at a time, to respective shift register means,
sensing the polarity of the bits which form each of said multiple bit data streams that are supplied to said shift register means and detecting a particular bit pattern wherein any two successive bits of a data stream are of opposite polarity relative to one another as said data streams are serially proagated through respective shift register means,
concurrently loading the contents of said shift register means into respective output register means whenever said particular bit pattern is detected in any of said plurality of data streams,
the last data bits to be loaded into each of said plurality of output register means providing a normalized representation of said corresponding data streams.

* * * * *